United States Patent
Goetz

(10) Patent No.: US 11,611,248 B2
(45) Date of Patent: Mar. 21, 2023

(54) STATOR FOR AN ELECTRIC MACHINE WITH IMPROVED COOLING, ELECTRIC MACHINE AND MOTOR VEHICLE

(71) Applicant: Dr. Ing. h.c. F. Porsche Aktiengesellschaft, Stuttgart (DE)

(72) Inventor: Stefan Goetz, Forstern (DE)

(73) Assignee: Dr. ing. h. c. F. Porsche AG, Stuttgart (DE)

( * ) Notice: Subject to any disclaimer, the term of this patent is extended or adjusted under 35 U.S.C. 154(b) by 418 days.

(21) Appl. No.: 16/942,881

(22) Filed: Jul. 30, 2020

(65) Prior Publication Data

US 2021/0036561 A1    Feb. 4, 2021

(30) Foreign Application Priority Data

Aug. 2, 2019    (DE) ...................... 10 2019 120 944.7

(51) Int. Cl.
| | |
|---|---|
| *H02K 1/20* | (2006.01) |
| *H02K 15/02* | (2006.01) |
| *H02K 1/16* | (2006.01) |
| *H02K 9/22* | (2006.01) |

(52) U.S. Cl.
CPC ................. *H02K 1/20* (2013.01); *H02K 1/16* (2013.01); *H02K 9/22* (2013.01); *H02K 9/223* (2021.01); *H02K 15/024* (2013.01)

(58) Field of Classification Search
CPC .............................. H02K 9/22; H02K 2201/06
USPC ..................................... 310/216.013, 216.014
See application file for complete search history.

(56) References Cited

U.S. PATENT DOCUMENTS

| | | | |
|---|---|---|---|
| 2003/0077476 | A1 | 4/2003 | Reutlinger |
| 2010/0207465 | A1* | 8/2010 | Dutau ....................... H02K 1/20 310/64 |
| 2011/0221286 | A1* | 9/2011 | Uchiyama ................ H02K 1/20 310/54 |

(Continued)

FOREIGN PATENT DOCUMENTS

| | | |
|---|---|---|
| DE | 100 51 499 | 4/2002 |
| EP | 2 793 375 | 3/2018 |

(Continued)

OTHER PUBLICATIONS

Machine translation of WO 2021/090001 A1 Year:2021 (Year: 2021).*
Machine translation of JP 2016-129447 A Year:2016 (Year: 2016).*
German Search Report dated Apr. 9, 2020.

*Primary Examiner* — Ahmed Elnakib
*Assistant Examiner* — Minki Chang
(74) *Attorney, Agent, or Firm* — Gerald E. Hespos; Michael J. Porco

(57) ABSTRACT

A stator (1) for an electric machine (100) has stator laminations (3) stacked in an axial direction (A) to form a stator lamination stack (2). The stator laminations (3) have strip-shaped inserts (4) extending in a radial direction (R). The inserts (4) have a higher thermal conductivity than the rest of the stator lamination (3). The stator laminations (3) are rotated in relation to one another in an azimuthal direction (U) about an angle of rotation (D) in such a manner that the inserts (4) of directly adjacent stator laminations (3) are not arranged one above another in the axial direction (A). An electric machine (100), a motor vehicle (200) and a method for producing a stator (1) also are provided.

14 Claims, 2 Drawing Sheets

(56) References Cited

U.S. PATENT DOCUMENTS

2014/0361649 A1* 12/2014 Chong ................... H02K 1/185
310/54
2018/0175705 A1    6/2018 Festa et al.

FOREIGN PATENT DOCUMENTS

JP           2016129447 A  *  7/2016
WO     WO-2021090001 A1  *  5/2021    ............... H02K 1/20

* cited by examiner

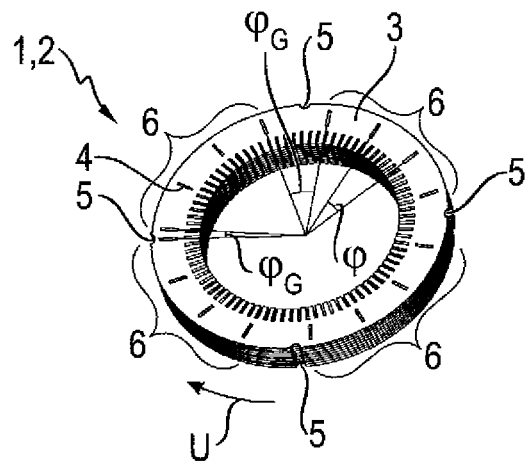
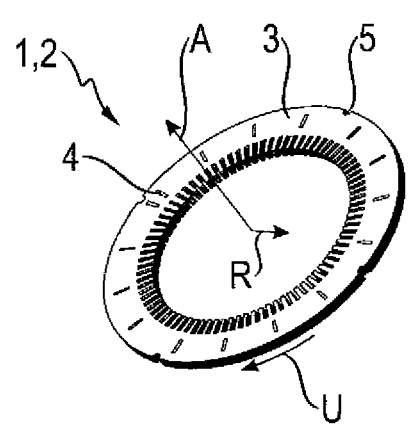
Fig. 1(a) Fig. 1(b)
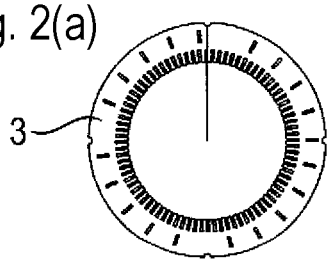
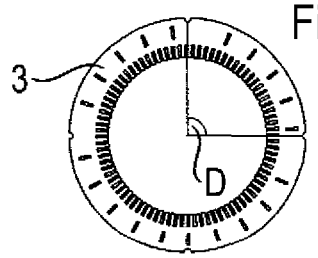
Fig. 2(a) Fig. 2(b)
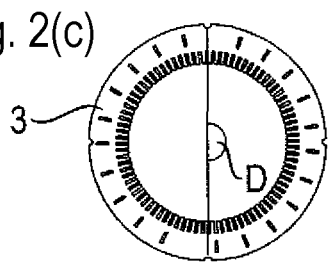
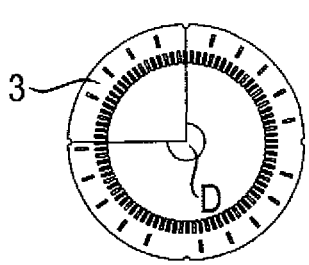
Fig. 2(c) Fig. 2(d)
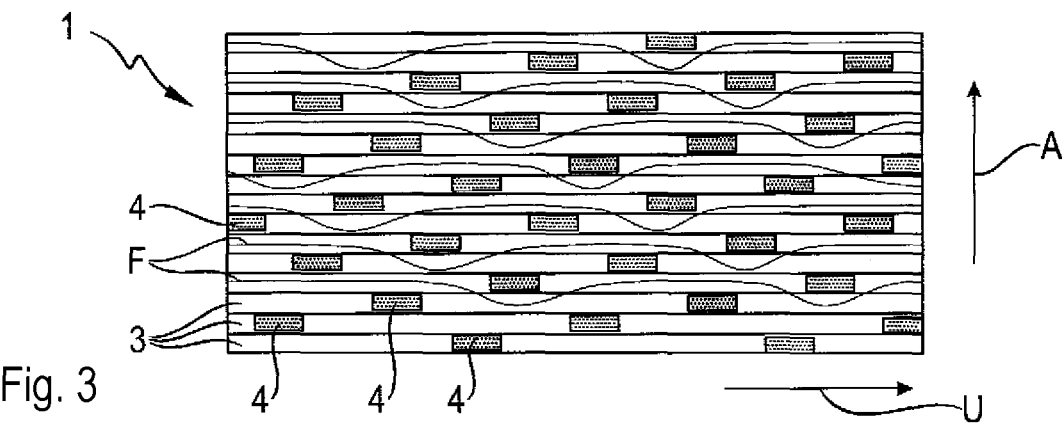
Fig. 3

STATOR FOR AN ELECTRIC MACHINE WITH IMPROVED COOLING, ELECTRIC MACHINE AND MOTOR VEHICLE

CROSS REFERENCE TO RELATED APPLICATION

This application claims priority under 35 USC 119 to German Patent Appl. No. 10 2019 120 944.7 filed on Aug. 2, 2019, the entire disclosure of which is incorporated herein by reference.

BACKGROUND

Field of the Invention

The invention relates to a stator for an electric machine, an electric machine, a motor vehicle and a method for producing a stator.

Related Art

The power of electric machines generally is limited by the thermal limits thereof. The focus here is on the stator. The electric lines of the stator conventionally generate most of the heat because of ohmic resistances. These electric lines and the stator iron of the stator lamination stack become the power-limiting component of an electric machine because of magnetization and Eddy current losses. In addition to the heat compatibility of the installed components, cooling plays a crucial part. Cooling elements arranged on the outside of the stator are used widely to dissipate heat. However, the heat has to be guided by the stator yoke to the outside to the cooling elements.

Silicon steel, often simply called stator iron, customarily is used for producing the stator yoke. Cobalt and nickel alloys are used more rarely for the stator yoke. The thermal conduction of the stator iron from the stator grooves to the cooling elements is limited greatly because of the low thermal conductivity of the materials used. A thinner stator yoke, i.e. a smaller stator outside diameter, would be thermally advantageous, but causes significant disadvantages in respect of the magnetic flux through the stator. Too thin a stator yoke would be neutralized and the magnetic flux would not be maintained.

EP 2 793 375 B1 discloses a stator for an electric machine where the stator has thermal conductors to increase the thermal conductivity of the stator yoke. The thermal conductors improve the transport of heat from the interior of the stator to the outer side of the stator. However, a problem in this connection is that thermal conductors typically do not have good magnetic conductivity and therefore obstruct the magnetic flux in the stator. The consequence is high power losses.

It is therefore an object of the invention to provide a stator that does not have the above-described disadvantages of the prior art, but rather permits very good thermal conduction through the stator yoke from the interior of the stator toward the outer side of the stator and at the same time minimizes an obstruction of the magnetic flux in the stator.

SUMMARY

The invention relates to a stator for an electric machine. The stator has stator laminations stacked in an axial direction to form a stator lamination stack. The stator laminations have strip-shaped inserts extending in a radial direction. The inserts have a higher thermal conductivity than the rest of the stator lamination. The stator laminations are rotated in relation to one another in an azimuthal direction about an angle of rotation so that the inserts of directly adjacent stator laminations are not arranged one above another in the axial direction.

According to the invention, the magnetic flux flowing in the azimuthal direction is not obstructed by the inserts, but rather is able to change to an adjacent stator lamination at the location where an insert is arranged. Thus, the magnetic flux can flow in a type of slalom with minimal obstruction in the azimuthal direction through the stator.

The individual stator laminations may be identical. This is expedient since tools for producing the stator laminations are expensive, and therefore cost savings are is possible by standardizing the components of the stator.

The stator laminations of the stator disclosed herein are stacked in a manner rotated in relation to one another so that the inserts of directly adjacent stator laminations do not lie directly above one another. Thus, a second stator lamination is centered on a first stator lamination but is rotated about an angle of rotation in the azimuthal direction. A third stator lamination is centered on the second stator lamination but is rotated about the angle of rotation in the azimuthal direction. This is repeated until all of the stator laminations are stacked to form the stator lamination stack. Within the context of the present invention, the azimuthal direction describes the circumferential direction of the stator. The rotation in the azimuthal direction is therefore a rotation within the main plane of extent of the stator lamination about the geometric center point of the stator lamination. Within the context of the present invention, all of the angles mentioned are understood as angles within the main plane of extent of the stator lamination. It is conceivable for a stator lamination to have 10 or more, preferably 15 or more, particularly preferably 20 or more inserts.

According to one embodiment, a length of the inserts in the radial direction is at least four times a width of the inserts in the azimuthal direction. This permits a very well directed and powerful thermal conduction from the interior of the stator toward the outer side thereof.

According to a further embodiment, a thickness of the inserts in the axial direction corresponds to a thickness of the stator laminations in the axial direction. This improves the thermal conduction and permits tight packing of the stator lamination stack. It is conceivable for the thickness of the stator laminations to be between 100 μm and 1 mm, preferably between 200 μm and 400 μm.

The stator laminations may have at least two, preferably four, recesses on their outer side, and the recesses are distributed uniformly in the azimuthal direction. The stator laminations are rotated in relation to one another in the azimuthal direction so that the recesses of all of the stator laminations are one above another in the axial direction. The recesses of the stator laminations thus produce registration recesses arranged in the axial direction over the length of the stator for securing the stator.

The stator laminations have n recesses arranged so that n−1 stator laminations are between two stator laminations having insert parts arranged above one another in the axial direction, and the stator preferably does not have inserts that are arranged above one another in the axial direction with the inserts of the two stator laminations. This makes it is possible in an advantageous manner for the stator laminations to be rotated so that the registration recesses are continuous in the axial direction and at the same time the distance between two inserts lying one above another in the axial direction is at maximum, which further reduces a disturbance to the magnetic flux. In the case of n recesses, the angle of rotation therefore is α=360°/n.

According to some embodiments, the inserts are not distributed uniformly in the azimuthal direction. This permits an advantageously wide and skillful spacing of the inserts.

The inserts may be arranged in the azimuthal direction in groups of at least two inserts. The inserts of a group are spaced apart from one another in the azimuthal direction by an azimuthal angle, and the groups may be spaced apart from one another in the azimuthal direction by group angles. The azimuthal angles of all of the groups of this embodiment are identical.

The azimuthal angle and the group angles may differ from one another, and the group angles preferably differ from one another.

The inserts may be made at least partially from aluminum and/or copper. These materials have good thermal conductivity and can be rolled excellently in in the form of inserts.

The inserts may have an electrically insulating coating, such as an electrically insulating varnish, to reduce disturbance in the magnetic flux.

An outer side of the stator may have a cooling element, such as a cooling jacket and/or cooling ribs to permit effective dissipation of the heat in the outer side of the stator. The cooling element may be produced least partially produced from aluminum. It is conceivable for the cooling element to be shrunk thereon.

The invention also relates to an electric machine having the above-described stator.

The invention further relates to a motor vehicle having such an electric machine.

The invention also relates to a method for producing the above-described stator, including punching a metal sheet to form a preliminary stator lamination part having slots, punching the inserts, rolling the inserts into the slots, and stacking the preliminary stator lamination parts with rolled-in inserts as stator laminations in a manner rotated in relation to one another and then packaging.

All of the details, features and advantages disclosed above relate equally to the stator, the electric machine, the motor vehicle and to the method according to the invention.

Further details, features and advantages of the invention will emerge from the drawings and from the description below of preferred embodiments with reference to the drawings. The drawings here illustrate merely exemplary embodiments of the invention that do not limit the inventive concept.

BRIEF DESCRIPTION OF THE DRAWINGS

FIGS. 1(a) and (b) are schematic illustrations of a stator according to an exemplary embodiment of the present invention.

FIGS. 2(a) to (d) are schematic illustrations in each case of a stator lamination of a stator according to an exemplary embodiment of the present invention.

FIG. 3 is a schematic illustration of a section through a stator according to an exemplary embodiment of the present invention.

DETAILED DESCRIPTION

Figure 4:
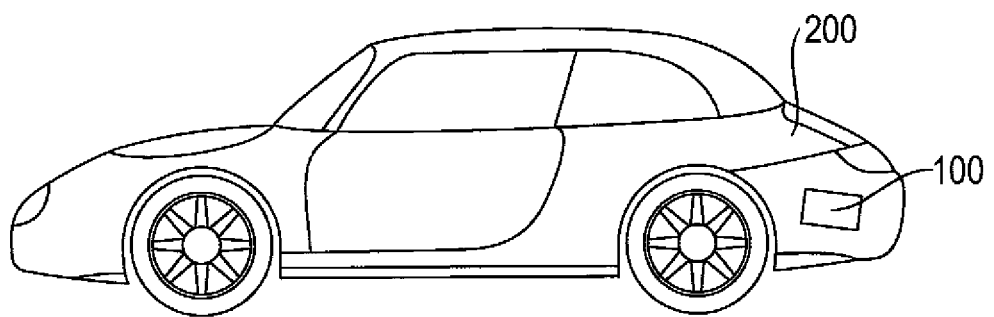
FIG. 4 is a schematic illustration of a motor vehicle according to an exemplary embodiment of the present invention.

FIGS. 1(a) and (b) are each schematic illustrations of a stator 1 according to an exemplary embodiment of the present invention with a stator lamination stack 2. The stator lamination stack 2 has stator laminations 3 which are stacked on one another in the axial direction A and are welded to one another. During the operation of the stator 1, heat arises primarily in the interior of the stator 2. A cooling jacket, not illustrated, composed of aluminum is shrunk onto the outer side of the stator 1. Cooling liquid flows through the cooling jacket and cools the outer side of the stator lamination stack 2. The cooling jacket is secured at the four registration recesses 5 distributed uniformly in the azimuthal direction. In order to improve thermal conduction from the interior of the stator lamination stack 2 toward the outer side of the stator lamination stack 2, the stator laminations 3 have strip-shaped inserts 4 arranged in the radial direction R. The inserts 4 are manufactured from a material having good thermal conductivity, for example copper or aluminum. The radiant arrangement of the inserts 4 which readily conduct heat makes it possible for the heat to be readily guided from the interior toward the cooling jacket.

Materials having good thermal conductivity frequently have poor conductivity for the magnetic flux (see identifier F in FIG. 3). Although the inserts 4 are therefore advantageous for the thermal conductivity, they obstruct the magnetic flux in the azimuthal direction U during operation of the stator.

In order to reduce this obstruction, the stator laminations are rotated in relation to one another about an angle of rotation D in the azimuthal direction U. This cannot be seen for illustrative reasons in FIG. 1, but is illustrated in FIG. 2.

In the exemplary embodiments illustrated here, the inserts 4 are arranged in groups 6 of in each case four inserts 4. Within each group 6, the inserts 4 are spaced apart from one another in the azimuthal direction U by the azimuthal angle φ. The azimuthal angle φ is identical in size in all of the groups 6. The groups 6 are in turn spaced apart from one another in the azimuthal direction U by the group angle φG. The group angles φG between the different groups 6 differ in size.

FIGS. 2(a) to (d) are schematic illustrations in each case of a stator lamination 3 of a stator 1 according to an exemplary embodiment of the present invention. For better visibility, the details of the stator laminations 3 are not designated specifically here. Stator laminations 3 of a stator 1 according to one of the exemplary embodiments from FIG. 1 are illustrated. FIGS. 2(a) to (d) show four stator laminations 3 which are each rotated about the angle of rotation D in the azimuthal direction U. The stator laminations 3 each have four registration recesses. So that the registration recesses in the stator laminations 3 stacked above one another as the stator lamination stack lie above one another in the axial direction, the stator laminations 3 are rotated with respect to one another about the angle of rotation D=360°/4=90°. It is therefore possible in an advantageous manner with identical, but rotated stator laminations 3 to permit good thermal conduction from the interior of the stator to the outer side thereof and nevertheless not to obstruct the magnetic flux by inserts arranged in the manner of barriers and poorly conducting the magnetic flux.

FIG. 3 is a schematic illustration of a section through a stator 1 according to an exemplary embodiment of the present invention. The stator laminations 3 which are stacked above another in the axial direction A and are rotated in relation to one another in the azimuthal direction can be seen. For the sake of clarity, only three stator laminations 3 are designated here. The inserts 4, only four inserts 4 are designated for the sake of visibility, do not lie above one another in the axial direction A in the manner of barriers, but rather are offset in the form of a staircase. This makes it possible for the magnetic flux F to flow relatively undisturbed by the fact that it can change to an adjacent stator lamination 3 in order to bypass the inserts 4.

FIG. 4 is a schematic illustration of a motor vehicle 200 according to an exemplary embodiment of the present invention with an electric machine 100 according to an exemplary embodiment of the present invention. The electric machine 100 has a stator, not shown and designated specifically here, according to an exemplary embodiment of the present invention.

What is claimed is:

1. A stator for an electric machine, having a plurality of stator laminations stacked in an axial direction to form a stator lamination stack, the stator laminations having a plurality of strip-shaped inserts extending in a radial direction, the inserts having a higher thermal conductivity than the rest of the stator lamination, wherein the stator laminations are rotated in relation to one another in an azimuthal direction about an angle of rotation in such a manner that the inserts of directly adjacent stator laminations are not arranged one above another in the axial direction.

2. The stator of claim 1, wherein a length of the inserts in the radial direction is at least four times a width of the inserts in the azimuthal direction.

3. The stator of claim 1, wherein a thickness of the inserts in the axial direction corresponds to a thickness of the stator laminations in the axial direction.

4. The stator of claim 1, wherein the stator laminations have at least two recesses on their outer side, the recesses being distributed uniformly in the azimuthal direction, wherein the stator laminations are rotated in relation to one another in the azimuthal direction in such a manner that the recesses of all of the stator laminations are arranged one above another in the axial direction.

5. The stator of claim 4, wherein the stator laminations have n recesses, the recesses and the inserts are arranged so that n−1 stator laminations are arranged between two stator laminations having insert parts arranged above one another in the axial direction, and, in the axial direction between the two stator laminations, the stator does not have inserts arranged above one another in the axial direction with the inserts of the two stator laminations.

6. The stator of claim 1, wherein the inserts are not distributed uniformly in the azimuthal direction.

7. The stator of claim 6, wherein the inserts are arranged in the azimuthal direction in groups of at least two inserts, the inserts of a group are spaced apart from one another in the azimuthal direction by an azimuthal angle, and the groups are spaced apart from one another in the azimuthal direction by group angles, wherein the azimuthal angles of all of the groups are identical.

8. The stator of claim 7, wherein the azimuthal angle and the group angles differ from one another, and the group angles and differ from one another.

9. The stator of claim 1, wherein the inserts are manufactured at least partially from aluminum and/or copper.

10. The stator of claim 1, wherein the inserts have an electrically insulating coating.

11. The stator of claim 1, wherein the stator has a cooling element on its outer side.

12. An electric machine having the stator of claim 1.

13. A motor vehicle having the electric machine of claim 12.

14. A method for producing the stator of claim 1, comprising punching a metal sheet to form a preliminary stator lamination part having slots, punching the inserts, rolling the inserts into the slots, stacking the preliminary stator lamination parts with rolled-in insert parts to form stator laminations rotated in relation to one another and packaging the stator laminations.

* * * * *